United States Patent
De Mattia

(10) Patent No.: US 9,278,511 B2
(45) Date of Patent: Mar. 8, 2016

(54) METHOD FOR PRODUCING A CURVED SECTION PIECE OF COMPOSITE MATERIAL FROM A RECTILINEAR PREFORM OF FIBRE LAYERS

(71) Applicant: Airbus Operations SAS, Toulouse (FR)

(72) Inventor: Denis De Mattia, Basse Goulaine (FR)

(73) Assignee: Airbus Operations SAS (FR)

( * ) Notice: Subject to any disclaimer, the term of this patent is extended or adjusted under 35 U.S.C. 154(b) by 217 days.

(21) Appl. No.: 13/915,695

(22) Filed: Jun. 12, 2013

(65) Prior Publication Data
US 2013/0327472 A1    Dec. 12, 2013

(30) Foreign Application Priority Data
Jun. 12, 2012   (FR) ...................................... 12 55492

(51) Int. Cl.
| | |
|---|---|
| *B27D 1/08* | (2006.01) |
| *B32B 38/00* | (2006.01) |
| *B32B 37/00* | (2006.01) |
| *B29C 70/46* | (2006.01) |
| *B29C 53/08* | (2006.01) |
| *B29L 31/00* | (2006.01) |
| *B29L 31/30* | (2006.01) |

(52) U.S. Cl.
CPC ........... *B32B 38/0012* (2013.01); *B29C 53/083* (2013.01); *B29C 70/46* (2013.01); *B32B 37/0046* (2013.01); *B29L 2031/001* (2013.01); *B29L 2031/3082* (2013.01); *B29L 2031/7739* (2013.01); *Y10T 156/1044* (2015.01)

(58) Field of Classification Search
CPC .. B29C 2793/00; B29C 70/46; B29C 53/083; B29L 2031/001; B29L 2031/3082; B29L 2031/7739; B32B 37/0046; B32B 38/0012; Y10T 156/1044
USPC .................................. 156/222, 443, 226, 227
See application file for complete search history.

(56) References Cited

U.S. PATENT DOCUMENTS

| | | | |
|---|---|---|---|
| 2006/0108057 A1 | 5/2006 | Pham et al. | |
| 2009/0057948 A1* | 3/2009 | Krogager et al. | 264/258 |
| 2010/0102482 A1* | 4/2010 | Jones et al. | 264/320 |
| 2011/0097554 A1* | 4/2011 | Kehrl et al. | 428/174 |
| 2011/0104432 A1 | 5/2011 | Duqueine et al. | |
| 2013/0189482 A1* | 7/2013 | Dequine | 428/130 |

FOREIGN PATENT DOCUMENTS

| | | |
|---|---|---|
| EP | 1932652 A1 | 6/2008 |
| FR | 2928295 A1 | 9/2009 |
| JP | 58-076217 | 5/1983 |

* cited by examiner

*Primary Examiner* — Jacob T Minskey
*Assistant Examiner* — Vishal I Patel
(74) *Attorney, Agent, or Firm* — Lerner, David, Littenberg, Krumholz & Mentlik, LLP

(57) ABSTRACT

A method for producing a curved section piece from a rectilinear preform of preimpregnated fiber layers includes stacking layers on a deformable mandrel and winding the mandrel and bending the stacked layers on a bending tool on a rotation axis in a single phase and polymerizing the bent layers. The section piece includes a stack of N layers, at least a first portion of which is placed in a plane perpendicular to the rotation axis (X) and at least one second portion parallel to the axis (X) including at least one layer of fibers oriented at 0° along the length of the perform. The N fiber layers are stacked on the mandrel. A neutral fiber is placed on a portion of the mandrel closer to the rotation axis (X) than the last layer of fibers oriented at 0° stacked on the 0second portion parallel to the rotation axis (X).

5 Claims, 4 Drawing Sheets

METHOD FOR PRODUCING A CURVED SECTION PIECE OF COMPOSITE MATERIAL FROM A RECTILINEAR PREFORM OF FIBRE LAYERS

FIELD OF THE INVENTION

The present invention relates to a method for producing a curved section piece of composite material from a rectilinear preform of fibre layers. The invention relates more particularly to a method for producing a frame of an aircraft fuselage.

BACKGROUND OF THE INVENTION

According to an embodiment illustrated in FIG. 1, a fuselage frame 10 takes the form of a section piece with a Z section of which the central portion called the web 12 forms a complete or partial ring. The section piece comprises a first flange 14 called the inner flange placed on the inner edge of the web 12 and perpendicular to the latter and a second flange 16 called the outer flange placed on the outer edge of the web 12, also perpendicular to the latter.

A method for producing such a frame of composite material is described in document FR-2.928.295.

According to this document, a substantially rectangular strip is first made from a stack of three layers of preimpregnated fibres, each layer having fibres oriented in one direction, the strip comprising layers with different fibre orientations, one layer with fibres at 30°, one layer with fibres at 90° and another layer with fibres at 150°.

Secondly, the strip of fibre layers is placed on a mandrel of deformable material and then compressed on this mandrel so as to conform to its shape.

The deformable mandrel is capable of deforming between a rectilinear position and a curved position but has an incompressible or virtually incompressible cross section.

Next, the deformed strip placed on the mandrel of deformable material is placed in contact against a heated tool having on its periphery radial sections with a profile matching the cross sections of the mandrel. Thus, during the bending, the strip is compressed and sustains an increase in temperature.

Following the placement of this first strip, a second strip of three layers of preimpregnated fibres is cut in order to place it on another deformable mandrel and then compress it on the latter.

Next, this second strip deformed on its mandrel of deformable material is placed in contact against the first strip still in place on the tool and then compressed against the first strip.

In order to obtain a frame, it is necessary to fit, as above, several strips on one another before polymerizing the assembly thus formed.

In addition, layers with fibres oriented at 0° can be added manually between certain strips.

This operating mode is not fully satisfactory for the following reasons:

First, this operating mode leads to low productivity because a multitude of bending phases must be carried out in succession.

Secondly, the relative positioning between the strips proves difficult to achieve because the strips consist of preimpregnated fibres and slide relative to one another with difficulty in order to correct their relative position. Also, it is difficult to ensure that, during the bending, the two inner flanges of the two strips, the two webs of the two strips and the two outer flanges of the two strips are perfectly in contact with one another over the whole length of the frame. Because of these placement difficulties, the operators have to intervene many times to try to manually correct the defects that are found.

According to another problem, gradually as the strips are stacked, the outer radii increase in value while the inner radii reduce so that the difference in value between the strip already in place on the bending tool and the fitted strip leads to a defect called bridging, the two strips not being closely pressed against one another at the bottom of the radius of curvature.

According to another problem, it is impossible to bend the strips after they have been compacted without causing a sliding between the layers of preimpregnated fibres and in this way corrugations and creases of fibres.

According to another problem, the layers of the first strip remain in contact with the tool heated to a temperature of the order of 50° C. much longer than the layers of the last strip fitted.

Finally, according to another problem, the fibres oriented at 0° must be placed manually on the bent forms in order to reduce the risk of corrugation. This manual placement tends to increase the time and cost of production.

Document EP-1.932.652 discloses a method and an associated tool for bending a part made of composite material. In this case, a rectilinear and flat preform is placed between two moulds to obtain a rectilinear section piece with an L section. Then, this section piece with an L section is bent about a rotation axis. In this case, the section piece with an L section comprises a first flange which has a surface parallel to the rotation axis and which is placed between the rotation axis and an insert provided on one of the moulds. Consequently, if fibres oriented at 0° are placed on this flange they necessarily corrugate during the bending which causes defects in the part obtained.

BRIEF SUMMARY OF THE INVENTION

Therefore, an aspect of the present invention is directed to remedying the drawbacks of the prior art by proposing a method of producing a curved section piece of composite material from a rectilinear preform of fibre layers making it possible to reduce the risks of corrugation of the fibres oriented at 0°, notably on the inner flange.

Accordingly, the subject of the invention is a method for producing a curved section piece from a rectilinear preform of preimpregnated fibre layers, the method comprising in stacking layers on a deformable mandrel and in winding the said deformable mandrel and the stacked layers on a bending tool on a rotation axis, the said section piece comprising a stack of N layers, at least a first portion of the section piece being placed in a plane perpendicular to the rotation axis and at least one second portion parallel to the axis comprising at least one layer of fibres oriented at 0° along the length of the preform, characterized in that it comprises stacking the N fibre layers on the deformable mandrel, the deformable mandrel comprising a neutral fibre placed on a portion of the deformable mandrel closer to the rotation axis than the last layer of fibres oriented at 0° stacked on the second portion parallel to the rotation axis, in bending in a single phase the N layers inserted between the deformable mandrel and the bending tool and in polymerizing the said N bent layers.

BRIEF DESCRIPTION OF THE DRAWINGS

Other features and advantages will emerge from the following description of the invention, a description given only as an example with respect to the appended drawings in which.

DETAILED DESCRIPTION

Figure 1:
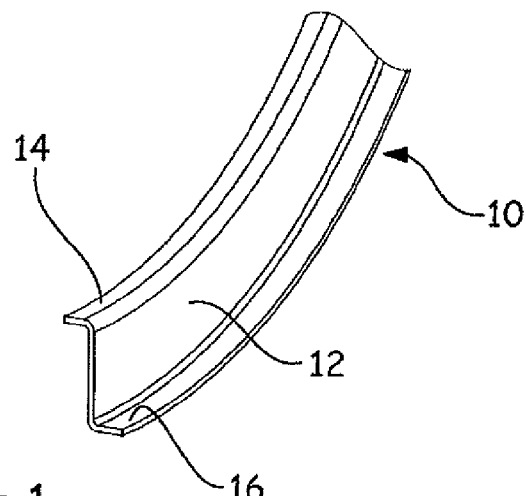
FIG. 1 is a view in perspective of a portion of a frame of an aircraft fuselage.

FIG. 1 shows a fuselage frame 10 in the form of a section piece with a Z section, of which the central portion called the web 12 forms a complete or partial ring. The section piece comprises a first flange 14 called the inner flange placed on the inner edge of the web 12 and perpendicular to the latter and a second flange 16 called the outer flange placed on the outer edge of the web 12, also perpendicular to the latter.

In an exemplary embodiment, the web has a height of 80 mm, a thickness of the order of 4 to 6 mm. The flanges have a width of the order of 30 mm.

The invention is not limited to this shape of section and to this application. Therefore, the invention can make it possible to obtain various curved section pieces with a J, Z, L, omega or other section.

According to an embodiment of the invention, the section piece 10 is curved along a rotation axis X and a radius of curvature R. Thus, the curved section piece 10 comprises at least one first portion, more particularly the web 12, in a plane perpendicular to the rotation axis X and at least one second portion, more particularly the flange 14, parallel to the axis X. The various portions of the section piece are connected together by curved portions. Thus, a first surface of a first portion is continuous with a first surface of each other portion. These first surfaces form a surface hereinafter called the outer surface. In the same manner, a second surface of the first portion is continuous with a second surface of each other portion. These second surfaces form a surface hereinafter called the inner surface of which one portion is oriented towards the rotation axis X.

According to an embodiment of the invention, the curved section piece 10 comprises a stack of N layers, N being an integer greater than ten layers. In order to give an order of magnitude, the section piece comprises some fifty layers.

The layers comprise preimpregnated fibres oriented for each layer in one direction.

This curved section piece is obtained from a rectilinear preform 20 having cross sections identical to those of the curved section piece 10 to be obtained.

"Longitudinal direction" means the largest dimension of the rectilinear preform. A transverse plane is a plane perpendicular to the longitudinal direction.

The rectilinear preform 20 is obtained by the stacking of the N layers necessary to form the curved section piece on a deformable mandrel 22, the inner flange 14 comprising at least one layer of fibres oriented along the length of the preform (in the longitudinal direction).

"Deformable" means that the mandrel can be deformed between a rectilinear position and a curved position but has an incompressible or virtually incompressible cross section.

The deformable mandrel 22 comprises a section that matches that of the rectilinear preform.

The N layers of the curved section piece are stacked on one another, the first layer placed on the mandrel forming the outer surface of the section piece and the last layer placed forming the inner surface of the section piece.

Figure 2:
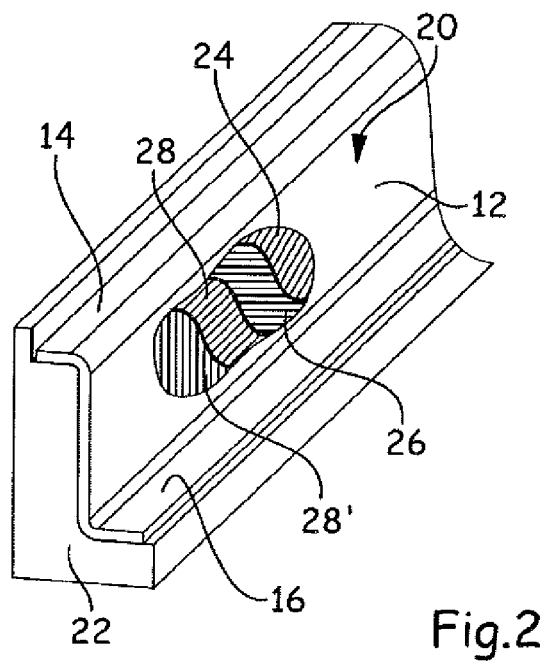
FIG. 2 is a view in perspective of a stack of layers on a rectilinear deformable mandrel according to an embodiment of the invention with a cutaway to illustrate the orientation of the fibres of the stacked layers.

As illustrated in FIG. 2, certain layers 24 may have fibres oriented at A° relative to the longitudinal direction and other layers 26 may have fibres oriented at −A° relative to the longitudinal direction, A being able to vary from 10 to 90°.

The values A are determined as a function of the mechanical characteristics are that sought. These values A are determined by the design office and must comply with a tolerance range of +/−3°. Therefore, when the nominal value A of the orientation is 30°, the fibres must form an angle with the longitudinal direction that is between 27° and 33°.

As an example, certain layers may have fibres oriented at 30° and other layers fibres oriented at −30°. Certain layers may have fibres oriented at 60° and other layers fibres oriented at −60°. Certain layers 28, 28' may have fibres oriented respectively at 0°, 90°.

Preferably, for each value of A, the curved section piece comprises as many layers with fibres oriented at A° as layers with fibres oriented at −A°. When the curved section piece 10 comprises a stack of 10 to 20 layers, it may comprise M' layers with fibres oriented at A° and M'+/−1 layers with fibres oriented at −A°. Beyond 20 layers, the section piece may comprise M layers with fibres oriented at A° and M+/−5% layers with fibres oriented at −A°.

Advantageously, a layer with fibres oriented at A° is adjacent to a layer with fibres oriented at −A°

According to an embodiment, the preform comprises alternating layers oriented at + and −30°, local reinforcements oriented at 90° between these layers at + and −30° which extend over the whole section of the section piece and reinforcements at 0° exclusively located in the internal flange 14. In an exemplary embodiment, the thickness of the internal flange 14 may be as much as 10 mm.

Figure 4:
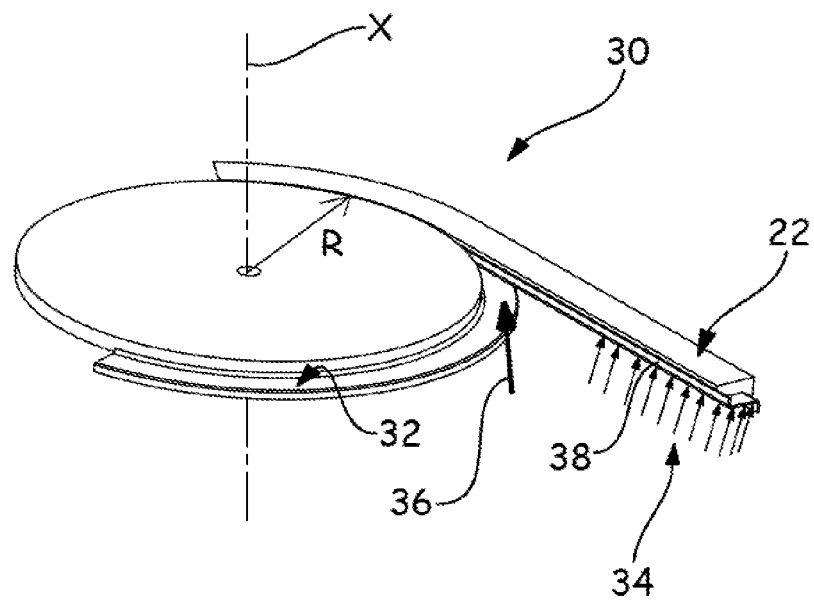
FIG. 4 is a schematic representation of a bending device used to bend the stack of layers and the mandrel of FIG. 2.

When all the layers of the curved section piece 10 are fitted on the deformable mandrel 22, a bending phase is carried out using a bending device 30. During the bending phase, the mandrel and all the layers are wound on a bending tool 32 of the bending device 30 on a rotation axis X, as illustrated in FIG. 4, the bending tool 32 having sections to match the sections of the internal surface of the curved section piece.

Advantageously, the zone of deformation of the preform (the zone of the preform at which it comes into contact with the bending tool 32) is raised to a temperature of approximately 70° C.

According to an embodiment, the bending device comprises preheating means 34 for heating the preform before it comes into contact with the bending tool 32 and heating means 36 making it possible to heat the deformation zone.

According to an embodiment of the invention, the mandrel 22 comprises an extension 38 of which a portion is closer to the rotation axis X than the last layer of fibres oriented at 0° stacked when the preform is placed on the mandrel and a neutral fibre 40 placed on this portion so that the said neutral fibre is placed between the last layer of fibres oriented at 0° stacked when the preform is placed on the mandrel and the rotation axis X.

"Neutral fibre" means the imaginary line of the mandrel at which the mandrel does not stretch and does not compress.

Advantageously, an identical or virtually identical number of layers with fibres oriented at A° and of layers with fibres oriented at −A° is provided. Moreover, all the fibres oriented at 0° are subjected to a tension force which limits the risks of corrugations of these fibres.

Figure 5:
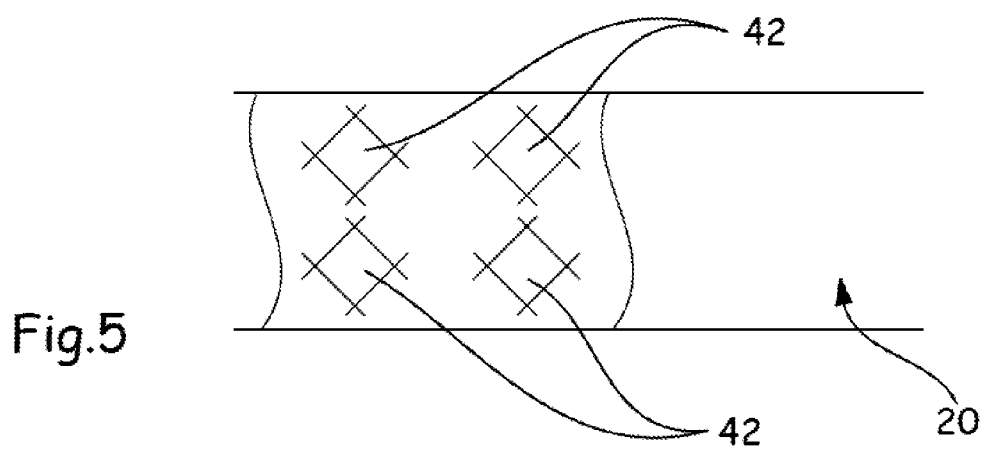
FIG. 5 is an illustration of the orientation of certain fibres before the bending.

The fibres oriented at A° form with the fibres oriented at −A° elementary diamonds 42 that are all identical when the preform is rectilinear as illustrated in FIG. 5. After deformation, the elementary diamonds are always symmetrical relative to a radial direction 44. During the deformation, the points of intersection of the fibres A° and −A° act as nodes at which the fibres pivot. Thus, the layers with fibres oriented at A° and those with fibres oriented at −A° deform without crease.

Figure 6:
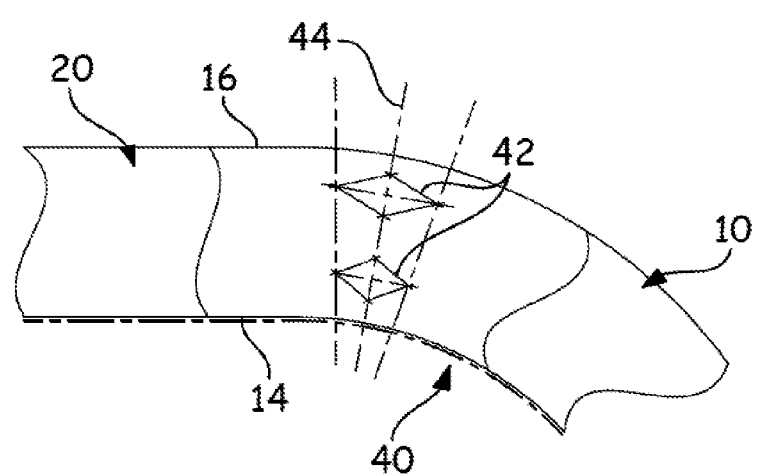
FIG. 6 is an illustration of the orientation of the same fibres as FIG. 5 after the bending operation.
Figure 7:
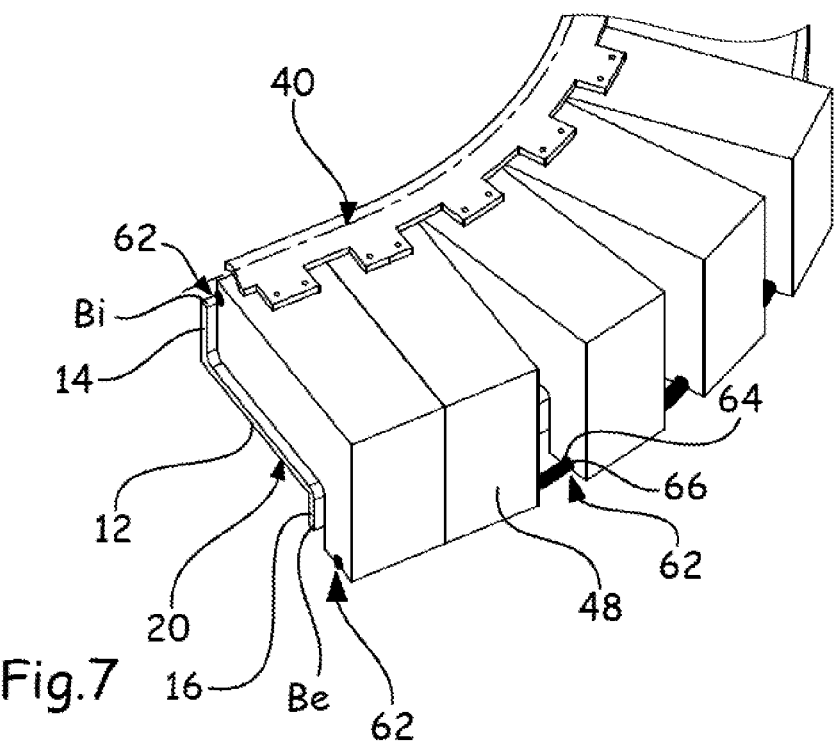
FIG. 7 is a view in perspective of a mandrel according to another variant of the invention.

According to an embodiment that is preferred and illustrated in FIG. 6, all the elementary diamonds are deformed symmetrically relative to radial directions 44. Since the neutral fibre 40 is placed between the last layer of fibres oriented at 0° C. and the rotation axis X, all the elementary diamonds 42 stretch in a direction perpendicular to the radial direction. In this case, all the fibres are subjected to a tension force and no creasing is possible, even the layers with the fibres oriented at 0° at the internal flange 14. As illustrated in FIG. 6, the orientation of the fibres oriented at A° and −A° in the rectilinear preform is modified after the bending.

Thus, the angle formed by the fibres oriented initially at A° reduces as a function of the distance from the rotation axis X while that formed by the fibres initially oriented at −A° increases as a function of the distance from the rotation axis X.

Because of the tolerance range +/−IT set by the design office of the order of +/−3°, the fibres supposed to be oriented at A° will be positioned at A+ IT° before the bending and the fibres supposed to be oriented at −A° will be positioned at −(A+IT)° before the bending. According to this arrangement, after the bending phase, all the fibres are oriented correctly and form an angle of +A +/−IT or of −A +/−IT. This arrangement makes it possible to significantly increase the height of the web. As an example, the height of the web was limited to approximately 80 mm for the prior art while it can reach approximately 170 mm for a method according to the invention.

When A=30° and the tolerance range is +/−3°, before deformation, the fibres of certain layers are oriented at +33° while the fibres of other layers are oriented at −33°. In this case, after bending, all the fibres are correctly oriented and are within the tolerance range. Thus, for certain layers, the fibres close to the internal flange 14 are oriented at 33° and the fibres close to the external flange 16 are oriented at 27° and are all within the orientation of 30°+/−3°.

After the bending phase, the bent layers are polymerized. According to an embodiment, it is possible to withdraw the deformable mandrel and apply a bladder over the bent preform in order to exert a pressure on the layers during the temperature cycle. As a variant, the bladder may be fitted over the mandrel during the polymerization phase, the mandrel performing the function of a plate to conform the external surface of the curved section piece.

Figure 3:
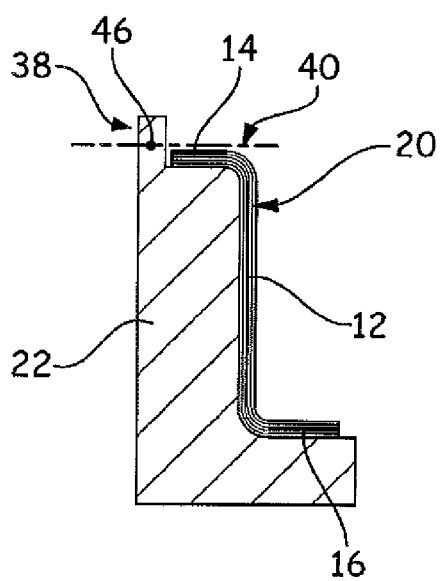
FIG. 3 is a cross section of a mandrel according to a first variant of the invention with a stack of fibre layers.

FIGS. 3, 7 to 10 show various deformable mandrels 22. According to one embodiment, the deformable mandrel is made of elastomer and comprises an extension 38 in which an inextendable reinforcement 46 is inserted embodying the neutral fibre 40, as illustrated in FIG. 3.

In certain cases, the extension capacity of the elastomer is insufficient. In this case, the deformable mandrel 22 comprises a plurality of disconnected sections 48 which are placed one after the other along the length of the mandrel.

Advantageously, all the sections 48 have the same cross section, notably matching the section piece to be obtained and all have the same length.

These sections 48 are connected together by a connecting element 50 which comprises a portion closer to the rotation axis X than the last layer of fibres oriented at 0° stacked, the neutral fibre 40 being placed in this portion.

In this embodiment, the deformation of the mandrel is not due to the material of the sections but to the fact that the sections are disconnected and can separate from one another like a fan.

According to one embodiment, the sections are made of a substantially rigid material, more rigid than an elastomer.

In addition, the connecting element 50 takes the form of a rule 52 which may be metallic. This rule 52 is thin in the direction of the rotation axis X, of the order of a few millimetres, and comprises at one edge 54, furthest from the rotation axis X, cut-outs 56 allowing the rule 52 to deform and to bend about the rotation axis X.

According to one embodiment, the rule 52 comprises, at its edge 54, a notch shape, with an alternation of cut-outs (56) and of protruding shapes 58. Each section 48 is connected by virtue of a link 60 to the rule 52, the said link 60 being provided at a protruding shape 58.

According to another feature of the invention, the deformable mandrel 22 comprises means 62 for holding the radially oriented fibres, namely at 90°.

In a transverse plane containing the rotation axis X, the preform 20 comprises an edge Bi closest to the rotation axis X and an edge Be furthest from the rotation axis X.

Advantageously, the means 62 for holding the fibres oriented at 90° are provided outside the preform, at least at the edge Be. Holding the fibres oriented at 90° at least at the edge Be limits the risks of corrugation of the fibres oriented at 90° which have a tendency to slide towards the rotation axis X during the deformation of the elementary diamonds 42.

According to an embodiment, the means 62 for holding the fibres oriented at 90° are only provided at the edge Be.

Figure 9:
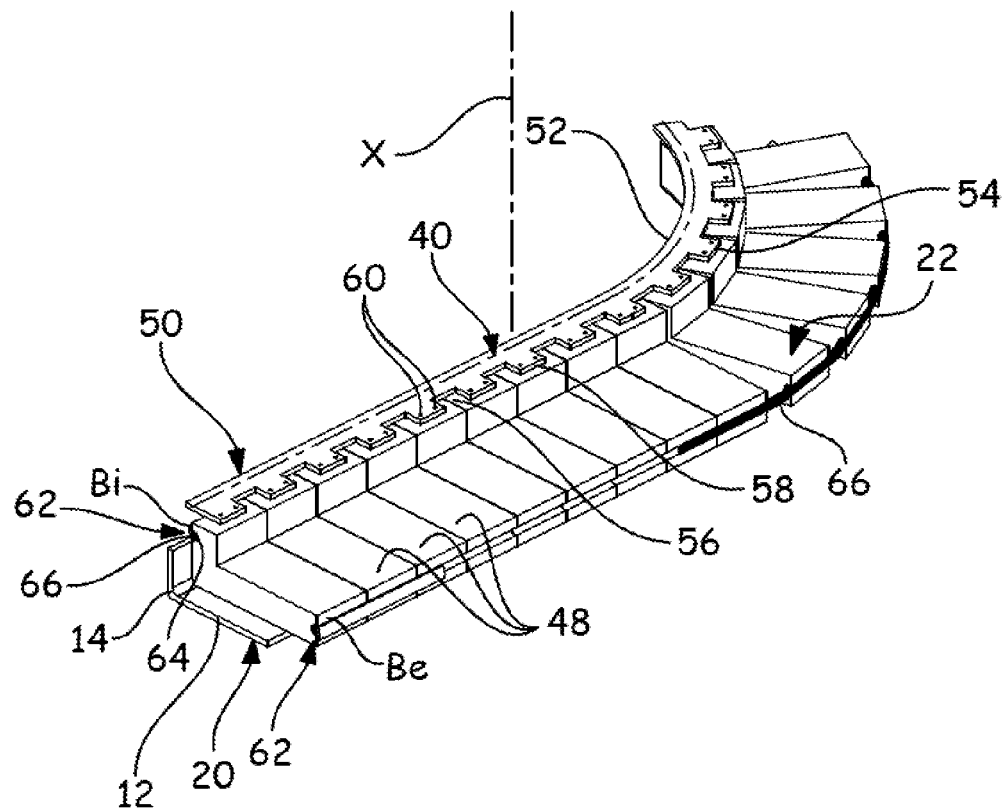
FIG. 9 is a view in perspective of the mandrel of FIG. 8.

According to another embodiment, illustrated in FIG. 9, the means 62 for holding the fibres oriented at 90° are provided on either side of the preform, at the edge Bi and the edge Be.

In order to be held, the fibres oriented at 90° protrude beyond the edge Be and preferably beyond the two edges Be and Bi.

According to one embodiment, the means 62 for holding comprise, at least at the edge Be, on the one hand a groove 64 at the mandrel into which the fibres oriented at 90° can be inserted, and, on the other hand, a retaining ring 66 (for example made of elastomer) which is inserted into the groove 64 and keeps the fibres oriented at 90°.

According to another feature, the deformable mandrel 22 comprises means for clamping the preform 20 at each end (along its length). At each end, this clamping can be carried out by virtue of a jaw, the preform 20 being pinched between the jaw and the preform. This arrangement makes it possible to hold the sections of the preform perpendicular to the neutral fibre and prevent them from inclining during the bending.

In order to obtain a frame with a Z section, a first operating mode consists in forming a Z-shaped rectilinear preform by using a deformable mandrel with a matching section as illustrated in FIG. 3, and then in bending it.

Figure 8:
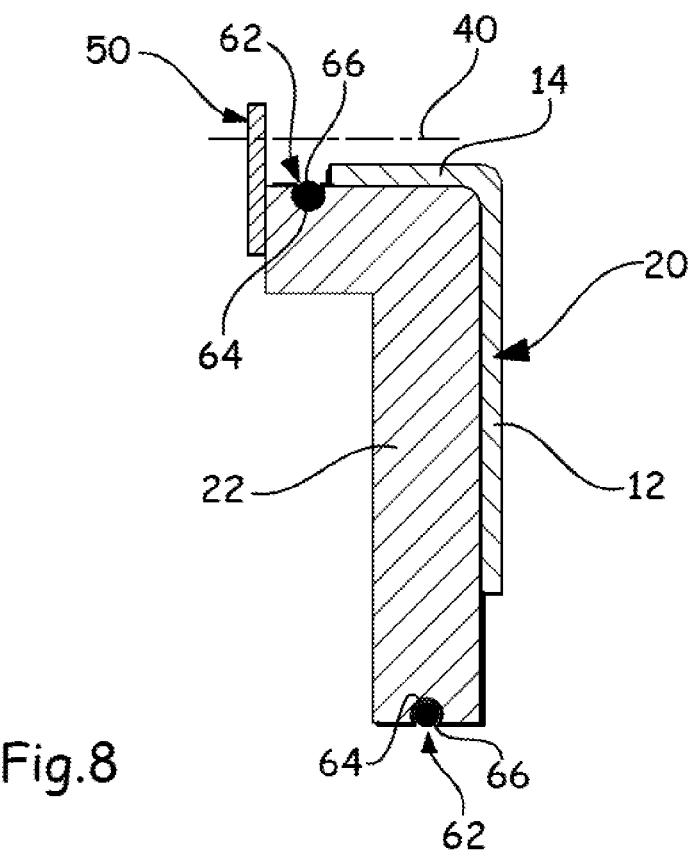
FIG. 8 is a section of a mandrel according to another variant of the invention.
Figure 10:
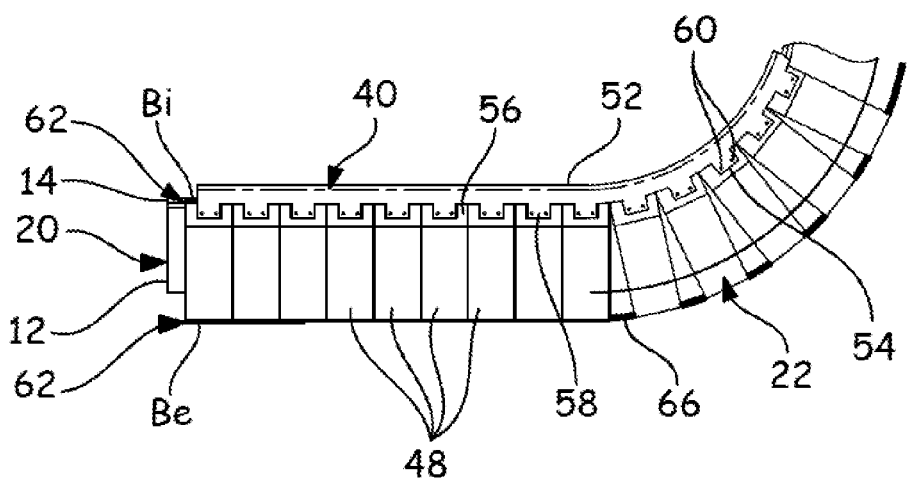
FIG. 10 is a view from above of the mandrel of FIG. 8.

According to another operating mode, a frame with a Z section is obtained by forming an L-shaped rectilinear preform using a mandrel as illustrated in FIGS. 8, 9 and 10.

According to this operating mode, initially, a rectilinear preform is produced with an L section. Then, this L-shaped rectilinear preform is bent, except for the shape of the section, these two steps are made in the same way as for the Z preform.

After bending, the mandrel is withdrawn and then the end of the L is folded down so as to form the external flange. This operation can be carried out by thermoforming under a bladder. This operation mode makes it possible to prevent the contraction of the web of the Z section from being propagated to the external flange during the bending. The method of the invention provides the following advantages:

First, the method makes it possible to greatly reduce the production costs and times because all the layers are bent in a single phase and not in a step-by-step method.

Secondly, the method according to the invention makes it possible to limit scrappage because of the absence of creasing or of bridging at the radii of curvature.

According to another advantage, it is possible to produce section pieces with webs of larger dimensions.

According to another advantage, the fact that the mandrel 22 comprises a neutral fibre 40 placed in an extension so that it is placed between the last layer of fibres oriented at 0° and the rotation axis X prevents inducing compression forces at the fibres oriented at 0° in the internal flange which therefore do not corrugate.

According to another advantage, the method of the invention makes it possible to control the position of the reinforcing fibres oriented at 90°.

According to another advantage of the invention, the speed of bending is markedly greater than that of the prior art, of the order of 8 mm/s, because the preform is preheated upstream of the bending tool.

Finally, the method provides a better control of the ageing of the resin because only the deformed portion sustains a temperature increase.

The invention claimed is:

1. A method for producing a curved section piece from a rectilinear preform of preimpregnated fibre layers, wherein said section piece comprises a stack of N layers, at least a first portion of the section piece being placed in a plane perpendicular to the rotation axis (X) and at least one second portion parallel to the axis (X) comprising at least one layer of fibres oriented at 0° along the length of the preform, the method comprising:

stacking the N fibre layers on a deformable mandrel, said deformable mandrel comprising a neutral fibre placed on a portion of the deformable mandrel, the neutral fibre dividing the deformable mandrel into a first segment and a second segment, the first segment being closer to the rotation axis (X) and the second segment being farther from the rotation axis (X) and receiving the last layer of fibres oriented at 0° stacked on the second portion parallel to the rotation axis (X);

bending in a single phase the N layers inserted between the deformable mandrel and the bending tool; and polymerizing said N bent layers.

2. The method according to claim 1, wherein the deformable mandrel comprises a plurality of disconnected sections placed one after the other along the length of the mandrel and connected together by a connecting element.

3. The method according to claim 1, further comprising holding radially oriented fibres at least on one edge (Be) of the preform furthest from the rotation axis (X).

4. The method of producing a curved section piece with a Z section according to claim 1, further comprising:

producing a rectilinear preform with an L section; and;

folding the end of the L section so as to form an outer flange prior to the polymerizing step, wherein the bending step comprises bending the rectilinear preform with an L section.

5. The method of claim 1, wherein a first layer with fibers oriented at an angle A° is adjacent to a second layer with fibers oriented at an angle −A°.

* * * * *